US006403722B1

(12) United States Patent
Severe et al.

(10) Patent No.: US 6,403,722 B1
(45) Date of Patent: Jun. 11, 2002

(54) DYNAMICALLY VULCANIZED ELASTOMERIC BLENDS INCLUDING HYDROGENATED ACRYLONITRILE-BUTADIENE COPOLYMERS

(75) Inventors: Geralda Severe, Forest Hill, MD (US); James L. White, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/678,347

(22) Filed: Oct. 3, 2000

(51) Int. Cl.$^7$ .................. C08L 27/04; C08L 33/00; C08L 33/02; C08L 33/04; C08L 35/00
(52) U.S. Cl. .................. 525/213; 525/217; 525/221; 525/222; 525/232; 525/238
(58) Field of Search ................ 525/213, 217, 525/221, 222, 232, 238

(56) References Cited

U.S. PATENT DOCUMENTS

| | | |
|---|---|---|
| 3,700,637 A | 10/1972 | Finch |
| 3,758,643 A | 9/1973 | Fischer |
| 4,337,329 A | 6/1982 | Kubo et al. .................. 525/339 |
| 4,384,081 A | 5/1983 | Kubo et al. .................. 525/339 |
| 4,405,756 A | 9/1983 | Oyama et al. ............... 525/237 |
| 4,464,515 A | 8/1984 | Rempel et al. .............. 525/338 |
| 4,631,315 A | 12/1986 | Buding et al. ............... 525/338 |
| 4,795,788 A | 1/1989 | Himmler et al. ............. 525/338 |
| 4,892,928 A | 1/1990 | Hoxmeier .................... 525/338 |
| 5,051,480 A | 9/1991 | Coran ......................... 525/227 |
| 5,187,232 A | 2/1993 | Musch et al. ................ 525/215 |
| 5,612,418 A | 3/1997 | Manley et al. .............. 525/222 |
| 6,066,697 A * | 5/2000 | Coran et al. ................. 525/193 |

FOREIGN PATENT DOCUMENTS

| | | |
|---|---|---|
| EP | 0 555 781 A1 | 8/1993 |
| EP | 0 559 515 A1 | 9/1993 |

* cited by examiner

*Primary Examiner*—Nathan M. Nutter
(74) *Attorney, Agent, or Firm*—Renner, Kenner, Greive, Bobak, Taylor & Weber

(57) ABSTRACT

An elastomeric blend prepared by the steps comprising: dynamically vulcanizing a dynamically-vulcanizable elastomer within a mixture that comprises the dynamically-vulcanizable elastomer, a hydrogenated acrylonitrile-butadiene copolymer, and a vulcanizing agent that is specific for the dynamically-vulcanizable elastomer during dynamic vulcanization. Also, a vulcanizate prepared by the steps comprising: dynamically vulcanizing a dynamically-vulcanizable elastomer within a mixture that comprises the dynamically-vulcanizable elastomer, a hydrogenated acrylonitrile-butadiene copolymer, and a vulcanizing agent that is specific to the dynamically-vulcanizable elastomer during dynamic vulcanization, and effecting vulcanization of the hydrogenated acrylonitrile-butadiene copolymer.

20 Claims, No Drawings

DYNAMICALLY VULCANIZED ELASTOMERIC BLENDS INCLUDING HYDROGENATED ACRYLONITRILE-BUTADIENE COPOLYMERS

TECHNICAL FIELD

This invention relates to dynamically vulcanized elastomeric blends including hydrogenated acrylonitrile-butadiene copolymers. More specifically, this invention is directed toward blends that include finely divided and well dispersed rubber particles within a matrix that includes hydrogenated acrylonitrile-butadiene copolymers. These blends can be employed as a substitute for substantially homogeneous blends of hydrogenated acrylonitrile-butadiene copolymer and are therefore economically advantageous.

BACKGROUND OF THE INVENTION

Hydrogenated acrylonitrile-butadiene copolymers, which may also be referred to as hydrogenated acrylonitrile-butadiene rubber or hydrogenated nitrile rubber, or simply HNBR, have proven to be very technologically useful. Indeed, hydrogenated nitrile rubber is distinguished by a high ultimate tensile strength, low abrasion, minimal permanent deformation after compressive and tensile stressing, high oil resistance, very high thermal stability, and excellent oxidative stability.

Unfortunately, hydrogenated nitrile rubber is expensive and therefore, although technologically useful, it is not always commercially useful. A possible solution to the economic disadvantages of using hydrogenated nitrile rubber is to blend hydrogenated nitrile rubber with other materials, such as other rubbers. In fact, elastomeric blends that include hydrogenated acrylonitrile-butadiene rubber are known. For example, U.S. Pat. No. 4,405,756 discloses a rubber composition that is co-vulcanizable with a sulfur cure system and includes 5 to 20 percent by weight of a partially hydrogenated unsaturated nitrile-conjugated diene copolymer rubber, 5 to 80 percent by weight of an ethylene-propylene-non-conjugated diene terpolymer rubber, and a required amount of at least one vulcanization accelerator selected from the group of thiuram accelerators and dithiocarbamate accelerators. These rubber compositions have the characteristics of the two rubbers that are employed including excellent oil resistance and ozone resistance and surprisingly show higher tensile strength and heat aging resistance than additively brought about by the mixing of the two rubbers.

U.S. Pat. No. 5,187,232 discloses a rubber blend that contains 20 to 60 percent by weight polychloroprene and 80 to 40 percent by weight hydrogenated nitrile rubber. Vulcanizates of this elastomeric blend demonstrate both high modulus and high dynamic stress-absorbing capacity.

European Patent Publication 0 555 781 A1 discloses a rubber composition comprising: i) partially hydrogenated unsaturated nitrile-conjugated diene copolymers having an iodine value not larger than 120, ii) an ethylenepropylene copolymer, and iii) a material selected from an ethylene-vinyl acetate copolymer, an acrylic rubber, and a hydrogenated butyl rubber. This rubber composition provides a vulcanized rubber having an improved constant-elongation fatigue performance, as well as a balanced thermal resistance, oil resistance, and other properties.

European Patent Publication 0 559 515 A1 discloses a rubber formulation comprising, based on the weight of the rubber formulation, i) 2 to 98 percent by weight of a hydrogenated nitrile rubber containing at least one functional group selected from a carboxylic acid group and an epoxy group, and ii) 98 to 2 percent by weight of an organopolysiloxane containing a functional group capable of reacting with the above-mentioned functional group. The hydrogenated nitrile rubber and the organopolysiloxane are crosslinked with and dispersed in each other.

U.S. Pat. No. 5,612,418 discloses a peroxide curable blend including a polyacrylate elastomer and a partially hydrogenated rubber. The cured product is characterized by having excellent heat and oil resistance, and is particularly suitable for making belts, hoses, gaskets and the like for use in automobile engines.

Therefore, there is a need for a material or blended material that exhibits the properties of hydrogenated nitrile rubber, and is therefore technologically useful, and that is likewise economical and therefore commercially useful.

SUMMARY OF INVENTION

It is, therefore, an object of the present invention to provide a material that exhibits the technologically useful characteristics of hydrogenated nitrile rubber.

It is another object of the present invention to provide a material that is more economical than hydrogenated nitrile rubber.

At least one or more of the foregoing objects, together with the advantages thereof over the known art relating to elastomeric blends that contain hydrogenated acrylonitrile-butadiene rubber, will become apparent from the specification that follows and are accomplished by the invention as hereinafter described and claimed.

In general the present invention provides an elastomeric blend prepared by the steps comprising: dynamically vulcanizing a dynamically-vulcanizable elastomer within a mixture that comprises the dynamically-vulcanizable elastomer, a hydrogenated acrylonitrile-butadiene copolymer, and a vulcanizing agent that is specific for the dynamically-vulcanizable elastomer during dynamic vulcanization.

The present invention also includes a vulcanizate prepared by the steps comprising: dynamically vulcanizing a dynamically-vulcanizable elastomer within a mixture that comprises the dynamically-vulcanizable elastomer, a hydrogenated acrylonitrile-butadiene copolymer, and a vulcanizing agent that is specific to the dynamically-vulcanizable elastomer during dynamic vulcanization, and effecting vulcanization of the hydrogenated acrylonitrile-butadiene copolymer.

The present invention also includes an elastomeric blend comprising: from about 25 to about 75 parts by weight of total polymer in the elastomeric blend of hydrogenated acrylonitrile-butadiene copolymer; and from about 75 to about 25 parts by weight of total elastomer in the elastomeric blend of dynamically vulcanized elastomer, where said dynamically vulcanized elastomer is in the form of vulcanized particles having an average diameter below about 1.4 micrometers.

The present invention also includes a vulcanizate comprising: from about 25 to about 75 parts by weight of vulcanized acrylonitrile-butadiene copolymer; and from about 75 to about 25 parts by weight of a dynamically vulcanized elastomer, where said dynamically vulcanized elastomer is in the form of vulcanized particles having an average diameter below about 2 $\mu$m and are dispersed throughout the said vulcanized hydrogenated acrylonitrile-butadiene copolymer.

PREFERRED EMBODIMENT FOR CARRYING OUT THE INVENTION

It has now been found that certain dynamically vulcanized blends that include hydrogenated acrylonitrile-butadiene copolymers (HNBR) as the continuous phase exhibit many of the properties of substantially homogeneous compositions of HNBR. Accordingly, the dynamically vulcanized blends of this invention are technologically useful and provide many economic benefits.

The blends of this invention are dynamically vulcanized and are characterized by the presence of finely divided and well dispersed rubber particles within a matrix that includes HNBR. Those skilled in the art will appreciate that dynamic vulcanization refers to the crosslinking of at least one elastomeric polymer within a blend with at least one other non-vulcanizing polymer while both polymers are undergoing mixing or masticating at some elevated temperature, and where the mixing or masticating continues until vulcanization is essentially complete. According to this invention, a dynamically-vulcanizable elastomer is vulcanized within a blend including HNBR while the polymers are undergoing mixing or masticating at an elevated temperature. Because HNBR is likewise vulcanizable, the step of vulcanizing the vulcanizable elastomer should not likewise crosslink a significant amount of the HNBR.

The dynamically vulcanized blends of this invention, therefore, include a co-continuous phase of HNBR and at least one dynamically vulcanized elastomer that is not HNBR. The term dynamically-vulcanizable elastomer refers to those elastomeric polymers or rubbers that can be selectively crosslinked while blended with HNBR without crosslinking the HNBR. The term dynamically vulcanized elastomers refers to those dynamically, vulcanizable elastomers that have been selectively cured or crosslinked during dynamic vulcanization. The term elastomeric polymers or rubbers generally refers to compositions of polymers that have an ultimate elongation that is greater than 100 percent and that quickly retract 150 percent or less of their original length within about 10 minutes after being stretched to 200 percent of their original length and held at 200 percent of their original length for about 10 minutes. It should also be understood that the dynamically vulcanized blends of this invention can include additional ingredients including, but not limited to, fillers, processing aids, and age-resistors (antidegradants).

In a preferred embodiment of this invention, the dynamically vulcanized blends will include HNBR and from about 10 to about 80 parts by weight of a dynamically vulcanized elastomer per 100 parts by weight of HNBR (phr). More preferably, the dynamically vulcanized blends of this invention will include HNBR and from about 25 to about 75 parts by weight of a dynamically vulcanized elastomer phr, and even more preferably from about 50 to about 75 parts by weight of a dynamically vulcanized elastomer phr.

Any known or commercially available HNBR can be used in practicing this invention. In fact, any partially hydrogenated unsaturated nitrile-conjugated diene copolymer rubber can be used. These partially hydrogenated copolymers typically derive from copolymers of an unsaturated nitrile monomer, such as acrylonitrile or methacrylonitrile, and at least one conjugated diene, such as 1,3-butadiene, isoprene, or 1,3-pentadiene. A part of the conjugated diene may be replaced by an unsaturated carboxylic acid such as acrylic acid, methacrylic acid, fumaric acid, or itaconic acid, an ester of the unsaturated carboxylic acid, such as its methyl, butyl, or 2-ethylhexyl ester, or an N-methylol acrylamide such as N-methylolacrylamide. These copolymers can be produced by various polymerization techniques including, but not limited to, emulsion polymerization and solution polymerization. These copolymers are then hydrogenated so that the resulting partially hydrogenated copolymer has a degree of hydrogenation, based upon the carbon-carbon double bonds emanating from the butadiene, of at least 85 percent, preferably of at least 91 percent, more preferably of at least 99 percent, and even more preferably of at least 99.5 percent. The degree of hydrogenation is typically determined by Fourier Transform Spectra [FTIR]. Commercial HNBR is available with percent of hydrogenation from 99$^+$ to 85 percent. In order to use sulfur crosslinking, which is the type used in this invention, HNBR preferably has at least 2 percent residual double bond. It should be understood that inasmuch as commercially available HNBR is not 100 percent hydrogenated, HNBR is often referred to as a partially hydrogenated copolymer. But, for purposes of this specification, no distinction is made between those copolymers that are hydrogenated or partially hydrogenated so long as the copolymers meet the above specifications for a degree of hydrogenation. Therefore, the terms hydrogenated or partially hydrogenated nitrile rubber will be used interchangeably. Various techniques are known in the art for hydrogenating these copolymers including, but not limited to, those techniques disclosed in U.S. Pat. Nos. 3,700,637, 4,337,329, 4,384,081, 4,464,515, 4,631,315, 4,795,788, 4,892,928, and U.S. Pat. No. 5,164,457, which are incorporated herein by reference.

Examples of partially hydrogenated copolymers that are useful in practicing the present invention include hydrogenated acrylonitrile-butadiene copolymer rubber (HNBR), hydrogenated acrylonitrile-butadiene-isoprene copolymer rubber, and hydrogenated acrylonitrile-butadiene-methylacrylate copolymer rubber. As noted above, the hydrogenated acrylonitrile-butadiene copolymer is the most preferred hydrogenated nitrile rubber for practicing the present invention. Inasmuch as hydrogenated acrylonitrile-butadiene copolymer or HNBR is the most preferred hydrogenated copolymer for practicing the present invention, reference is often made simply to HNBR. It should be understood, however, that the term HNBR or hydrogenated nitrile rubber is used without limitation and will refer to any partially unsaturated nitrile-conjugated diene copolymer disclosed herein.

In a preferred embodiment, the HNBR should include between 5 and 60 percent by weight copolymerized acrylonitrile, and more preferably from about 50 to about 36 percent by weight copolymerized acrylonitrile. It is also preferred that the HNBR have a Mooney Viscosity of 40 to about 65, and preferably from about 50 to about 65 (ML 1+4) at 100° C.

Partially hydrogenated acrylonitrile-butadiene copolymer rubber is commercially available from Nippon Zeon of Japan under the tradename ZETPOL, or Bayer AG of Germany under the tradename THERBAN.

As noted above, the dynamically vulcanized blends of this invention will include finely divided and well dispersed rubber particles that derive from a dynamically-vulcanizable elastomer. These particles can derive from vulcanizable elastomers that include, without limitation, polychloroprene, epoxidised polyisoprene, bromobutyl, chlorobutyl and maleated natural rubber. These elastomeric compositions can be selectively crosslinked in the presence of HNBR without significantly curing the HNBR. Those skilled in the art will be able to readily select a crosslinking agent or technique that can be used to crosslink these polymers without crosslinking the HNBR. Although the crosslinking agent that can be used in practicing the present invention is dependent on the dynamically-vulcanizable elastomer that is employed, crosslinking agents that do not crosslink HNBR include, but are not limited to, metallic oxides and amines. Also, inasmuch as dynamic vulcanization is a well known technique, those skilled in the art will be able to readily select the proper equipment and techniques for carrying out the dynamic vulcanization including, but not limited to, the crosslinking temperature and mixing speed.

The finely divided and well dispersed rubber particles, i.e., the dynamically vulcanized elastomer, that are dispersed within the HNBR matrix according to this invention preferably have an average particle size smaller than about 4.0 $\mu$m, preferably of an average particle size smaller than about 1.5 $\mu$m, more preferably of an average size smaller than about 1.0 $\mu$m, and still more preferably of an average particle size of 0.5 $\mu$m or less.

One preferred embodiment of the present invention is directed toward a dynamically vulcanized blend that includes finely divided and well dispersed particles of polychloroprene within an HNBR matrix. Preferably, this blend will include HNBR and from about 25 to about 75 parts by weight polychloroprene per one hundred parts by weight of total elastomer. This blend can be prepared by crosslinking polychloroprene with zinc oxide and preferably magnesium oxide while the polychloroprene is undergoing mixing and masticating in a blend with HNBR. Zinc oxide can be used alone to vulcanize polychloroprene, but there is a potential for scorching because of the production of $ZnCl_2$, which is a vulcanization catalyst. It is preferred to add a scavenger for zinc chloride to prevent any scorching. This dynamic vulcanization is preferably carried out at a temperature of from about 150 to about 160° C. and within an internal mixer operating at from about 80 to about 81 revolutions per minute. Polycholoroprene can be obtained from Bayer Chemical under the tradename BAYPRENE and from E.I. Dupont under the tradename NEOPRENE. The polychloroprene grades differ in term of tendency to crystallize (polymerization temperature, or copolymerization with other monomers), type of modification (mercaptan or sulfur), processing behavior (precrosslinking), color and storage stability, different Mooney viscosities and ability to crosslink without sulfur and accelerator. Therefore, the curing will be slightly different among the different grades since the rate of vulcanization of polychloroprene depends on the amount of allylic chlorine in the polymer chains.

Another embodiment of the present invention is directed toward a dynamically vulcanized blend that includes finely divided and well dispersed particles of cured maleated epoxidised polyisoprene within an HNBR matrix. Preferably, this blend will include HNBR and from about 25 to about 75 parts by weight of cured maleated epoxidised polyisoprene per one hundred parts by weight HNBR. The maleated epoxidised polyisoprene can be cured by using zinc oxide. Additionally, an accelerator, such as stearic acid, can be used in conjunction with an activator to crosslink the HNBR ratio. Preferred activators are tetramethylthiuram disulfide (TMTD) and 2-Mercaptobenzothiazole (MBT). The dynamic vulcanization preferably takes place at a temperature of from about 154 to about 160° C. while the maleated epoxidised polyisoprene is mixed within the presence of HNBR within an internal mixer operating speed of from about 60 to about 65 revolutions per minute.

In an alternative embodiment, the maleated epoxidised polyisoprene can be prepared in situ. That is, a blend of epoxidised polyisoprene, HNBR, and maleic anhydride can be prepared, and shortly after contacting, the maleic anhydride an epoxidised polyisoprene will react to form maleated epoxidised polyisoprene. Generally, from about 1 to about 4 percent maleic anhydride per one hundred parts by weight epoxidised polyisoprene is used to prepare the maleated epoxidised polyisoprene. Preferably, the epoxidised polyisoprene, HNBR, and maleic anhydride are mixed at a temperature of about 120 to about 140° C. in order to obtain the maleated epoxidised polyisoprene. This mixing should preferably take place at from about 60 to about 80 revolutions per minute. As discussed above, zinc oxide is then added to the mixture to crosslink the maleated epoxidised polyisoprene while it is mixed with HNBR. Epoxidised natural rubber is available under the tradename EPOXYPRENE from Guthrie Latex, Inc. in Tucson, Ariz. There are two grades available from Guthrie Latex. The grades differ in the extent of modification (25 mole % epoxidised (EPOXYPRENE 25) and 50 mole % epoxidised (EPOXYPRENE 50).

Once the dynamically vulcanized blends of this invention are prepared, the hydrogenated acrylonitrile-butadiene rubber can be subsequently vulcanized to improve its mechanical properties as well as the mechanical properties of the overall blend. As those skilled in the art will appreciate, HNBR can be cured by using sulfur, peroxides, or derivatives thereof, such as sulfur donors/accelerators, such as tetramethyl thiuramdisulfide (TMTD), tetramethylthiuram monosulfide (TMTM), 2-mercaptobenzothiazole (MBT), dibenzothiazyldisulfide (MBTS), N-cyclohexyl-2-benzothiazylsulfenamide (CBS), etc. Typically, sulfur is employed in an amount from about 0 to about 1.5 parts by weight per one hundred parts by weight HNBR. Similarly, peroxides are used in an amount from about 3 to about 5 parts by weight per one hundred parts by weight HNBR, if the peroxide is pure, or from about 7 to about 13 parts if the peroxide is a 40% solution. In conjunction with these curatives, other cure accelerators can be employed, such as non-sulfur and non-peroxide cure accelerators.

For example, the sulfur and sulfur-containing cure systems that can be used in the present invention can include one or more sulfur curing accelerators. Suitable accelerators commonly employed include, for example, thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfonamides such as N-oxydiethylene-2-benzothiazole sulfonamide, N-cyclohexyl-2-benzothiazole sulfonamide, N,Ndiisopropyl-2-benzothiazole sulfonamide, N-tert-butyl-2-benzothiazole sulfonamide (TBBS) and the like; 2-mercaptoimidazoline, N,N-diphenylguanidine, N,N-di-(2-methylphenyl)-guanidine, thiazole accelerators such as 2-mercaptobenzothiazole, 2-(morpholinodithio) benzothiazole disulfide, zinc 2-mercaptobenzothiazole and the like; dithiocarbamate accelerators such as tellurium diethyldithiocarbamate, copper dimethyldithiocarbamate, bismuth dimethyldithiocarbamate, cadmium diethyldithiocarbamate, lead dimethyldithiocarbamate, zinc dibutyldithiocarbamate, zinc diethyldithiocarbamate, and zinc dimethyldithiocarbamate.

As noted, sulfur donor-type accelerators may be used in place of elemental sulfur or in conjunction with elemental sulfur if desired. Suitable amounts of sulfur and/or sulfur donor accelerators can be readily determined by those of ordinary skill in the art and generally range from about 3 to about 6 phr. The amounts of a sulfur donor accelerator can also be readily determined by those of ordinary skill in the art and generally range from about 3 to about 5 phr. Some examples of sulfur donor accelerators include: dimorpholino disulfide commonly referred to as Sulfasan R and various alkyl phenol disulfides that are commercially available from Pennwalt Corporation.

Examples of suitable peroxides that can be used as curing agents or cocuring agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis (pmonomethylene-benzoyl) peroxide, bis(p-nitrobenzoyl) peroxide, phenylacetyl peroxide, and the like. Suitable amounts of peroxide crosslinking agents can be readily determined by those having ordinary skill in the art and generally range from about 6 to about 13 phr.

Examples of inorganic peroxides that can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and the like.

Examples of polysulfide activators for the quinone-type co-curing agents include calcium polysulfide, sodium polysulfide, as well as organic polysulfides having the general formula R—(S)$_x$—R, where R is a hydrocarbon group and x is a number from 2–4. Examples of organic polysulfides are disclosed in U.S. Pat. No. 2,619,481.

The compositions of this invention can be compounded with various conventional additives as desired, including process and extender oils; processing aids such as various metal salts of stearic acid, mixtures of aromatic resin and fatty acids, sodium dodecyl sulfate as well as tackifying resins, plasticizers, antioxidants, antiozonants, waxes, cure accelerators, zinc oxide, stearic acid , UV stabilizers, fillers, and the like. These additives can be utilized in amounts conventionally employed in rubber compounds. Suitable fillers include, without limitation, petroleum-derived materials such as carbon black, ground coal, and cryogenically ground rubber, and mineral fillers such as hard clays, soft clays, chemically codified clays, mica, talc, calcium carbonate, titanium dioxide, amorphous precipitated hydrated silica, and mixtures thereof.

As discussed above, the dynamically vulcanized elastomeric blends of this invention can be employed as a substitute for substantially homogeneous blends of hydrogenated acrylonitrile-butadiene copolymer. As those skilled in the art will appreciate, hydrogenated acrylonitrile-butadiene rubber is technologically useful because of its excellent mechanical properties, oil resistance, ozone resistance, heat resistance, and abrasion resistance. The dynamically vulcanized blends of this invention likewise exhibit these properties. Namely, the dynamically vulcanized blends of this invention, upon curing of the HNBR, are characterized by a tensile strength of at least 4 MPa, preferably at least 5 MPa, more preferably at least 7.5 MPa. Also, the dynamically vulcanized blends of this invention, upon curing of the HNBR, are characterized by an oil resistance, as measured by the swelling of the rubber. Still further, the dynamically vulcanized blends of this invention, upon curing of the HNBR, are characterized by an ozone resistance.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

EXAMPLE 1

Three dynamically vulcanized blends that included particles of polychloroprene (mercaptan grade) dispersed within hydrogenated acrylonitrile-butadiene rubber (HNBR) were prepared. These blends were subsequently cured by vulcanizing the HNBR, and the properties of the resulting vulcanizate were analyzed.

Specifically, Sample 1 included 25 parts by weight polychloroprene and 75 parts by weight HNBR, Sample 2 included 50 parts by weight polychloroprene and 50 parts by weight HNBR, and Sample 3 included 75 parts by weight polychloroprene and 25 parts by weight HNBR.

These blends were prepared by introducing simultaneously both the polychloroprene and the HNBR into an internal mixer that was heated to about 150° C. The speed for the internal mixer was set at about 80 revolutions per minute. After mixing for about 3 minutes, about 5 parts by weight zinc oxide, about 2 parts by weight magnesium oxide, and about 1 part by weight stearic acid, where each amount was based on one hundred parts by weight of the polychloroprene and HNBR combined, were added. Mixing was continued for about 12 more minutes and during this time an increase in the torque was observed. After 3 additional minutes, the blend was removed from the internal mixer and placed on a two-roll mill. About 0.5 parts by weight sulfur, about 2 parts by weight of tetramethylthiuram disulfide (TMTD), and about 0.5 parts by weight 2-Mercaptobenzothiazole (MBT), per one hundred parts by weight of the polychloroprene and HNBR combined, were added as a cure system for the HNBR. The blend was removed from the mill and placed in a mold where vulcanization of the HNBR was effected at about 160° C. by using a Wabash compression molding.

The vulcanizate was characterized by using the procedure described in ASTM-412 for tension test and ASTM-624 for the tear strength, ASTM-D 573 for deterioration in air oven and ASTM-D 471 for oil aging. The tensile strengths and tear strengths were from 4.8 to 8.8 MPa and 15.6 to 28.0 KN/m before aging respectively. The percent change in tensile strength and elongation were −34.5 to −65.2 and −59.3 to −88.4 respectively after aging in oven air at 150° C. for two days.

EXAMPLE 2

Three dynamically vulcanized blends that included particles of cured maleated epoxidised polyisoprene dispersed within hydrogenated acrylonitrile-butadiene rubber (HNBR) were prepared. These blends were subsequently cured by vulcanizing the HNBR, and the properties of the resulting vulcanizate were analyzed.

Specifically, Sample 1 included 25 parts by weight cured maleated epoxidised polyisoprene and 75 parts by weight HNBR, Sample 2 included 50 parts by weight cured maleated epoxidised polyisoprene and 50 parts by weight HNBR, and Sample 3 included 75 parts by weight cured maleated epoxidised polyisoprene and 25 parts by weight HNBR.

These blends were prepared by forming maleated epoxidised polyisoprene in situ with HNBR. Specifically, epoxidised polyisoprene and HNBR were mixed for two minutes within an internal mixer at 140° C. and 60 revolutions per minute. Then, about 1 phr maleic anhydride was added to the mixture. Mixing continued for about two more minutes, and at this time an increase in torque was observed evidencing the reaction between the epoxidised polyisoprene and maleic anhydride to form maleated epoxidised polyisoprene. At this point, about 5 parts by weight zinc oxide, and about 1 part by weight stearic acid were added, where each amount was based on one hundred parts by weight of the uncured maleated epoxidised polyisoprene and HNBR combined. Mixing was continued for about 11 more minutes and during this time an increase in the torque was observed. After 4 additional minutes, the blend was removed from the internal mixer and placed on a 2-roll mill. About 0.5 parts by weight sulfur, about 2 parts by weight TMTD, and about 0.5 parts by weight MBT, per one hundred parts by weight of the maleated epoxidised polyisoprene and HNBR combined, were added as a cure system for the HNBR. The blend was removed from the mill and placed in a mold where vulcanization of the HNBR was effected at about 160° C. by using a Wabash compression molding.

The vulcanizate was characterized by using procedure described in ASTM-412 for tension test and ASTM-624 for the tear strength, ASTM-D 573 for deterioration in air oven and ASTM-D 471 for air aging. The tensile strengths and tear strengths were from 2.8 to 5.3 MPa and 14.4 to 16.2 KN/m before aging respectively. The percent change in tensile strength and percent elongation after aging in oven air at 150° C. for two days were from −36.5 to −65.8 and −33.8 to −80.2 respectively.

Based upon the foregoing disclosure, it should now be apparent that the elastomeric blends described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. An elastomeric blend prepared by the steps comprising:
dynamically vulcanizing a dynamically-vulcanizable elastomer within a mixture that comprises the dynamically-vulcanizable elastomer, a hydrogenated acrylonitrile-butadiene copolymer, and a vulcanizing agent that is specific for the dynamically-vulcanizable elastomer during dynamic vulcanization.

2. The elastomeric blend of claim 1, where the dynamically-vulcanizable elastomer is polychloroprene, maleated epoxidised polyisoprene, maleated polyisoprene, or mixtures thereof.

3. The elastomeric blend of claim 1, where the dynamically-vulcanizable elastomer is polychloroprene.

4. The elastomeric blend of claim 3, where the polychloroprene is dynamically vulcanized by using zinc oxide and magnesium oxide as the vulcanizing agent.

5. The elastomeric blend of claim 1, where the dynamically-vulcanizable elastomer is maleated epoxidised polyisoprene.

6. The elastomeric blend of claim 5, where the maleated epoxidised polyisoprene is dynamically vulcanized by using zinc oxide as the vulcanizing agent.

7. The elastomeric blend of claim 1 where the vulcanizing agent that is specific for the dynamically-vulcanizable elastomer during dynamic vulcanization is selected from the group consisting of metallic oxides and amines.

8. A vulcanizate prepared by the steps comprising:
dynamically vulcanizing a dynamically-vulcanizable elastomer within a mixture that comprises the dynamically-vulcanizable elastomer, a hydrogenated acrylonitrile-butadiene copolymer, and a vulcanizing agent that is specific to the dynamically-vulcanizable elastomer during dynamic vulcanization, and
effecting vulcanization of the hydrogenated acrylonitrile-butadiene copolymer.

9. The vulcanizate of claim 8, where the dynamically-vulcanizable elastomer is polychloroprene, maleated epoxidised polyisoprene, carboxylated acrylonitrile-butadiene rubber, or mixtures thereof.

10. The vulcanizate of claim 8, where the dynamically-vulcanizable elastomer is polychloroprene.

11. The vulcanizate of claim 10, where the polychloroprene is dynamically vulcanized by using zinc oxide and magnesium oxide as the vulcanizing agent.

12. The vulcanizate of claim 8, where the dynamically-vulcanizable elastomer is maleated epoxidised polylsoprene.

13. The vulcanizate of claim 8, where the vulcanizing agent that is specific to the dynamically-vulcanizable elastomer during dynamic vulcanization is selected from the group consisting of metallic oxides and amines.

14. An elastomeric blend comprising:
from about 25 to about 75 parts by weight of total polymer in the elastomeric blend of hydrogenated acrylonitrile-butadiene copolymer; and
from about 75 to about 25 parts by weight of total elastomer in the elastomeric blend of dynamically vulcanized elastomer, where said dynamically vulcanized elastomer is in the form of vulcanized particles having an average diameter below about 4 micrometers.

15. The elastomeric blend of claim 14, where said vulcanized particles have an average diameter below about 1.5 micrometers.

16. The elastomeric blend of claim 15, where said vulcanized particles have an average diameter below about 0.5 micrometers.

17. The elastomeric blend of claim 14, where said dynamically vulcanized particles include cured polychloroprene, cured maleated epoxidised polyisoprene, cured epoxidised polyisoprene, maleated natural rubber, and mixtures thereof.

18. A vulcanizate comprising:
from about 25 to about 75 parts by weight of vulcanized acrylonitrile-butadiene copolymer; and
from about 75 to about 25 parts by weight of a dynamically vulcanized elastomer, where said dynamically vulcanized elastomer is in the form of vulcanized particles having an average diameter below about 2 $\mu$m and are dispersed throughout the said vulcanized hydrogenated acrylonitrile-butadiene copolymer.

19. The vulcanizate of claim 18, where said vulcanized particles have an average diameter below about 0.5 $\mu$m.

20. The vulcanizate of claim 18, where said dynamically vulcanized elastomer includes cured polychloroprene, cured maleated epoxidised polyisoprene, epoxidised polyisoprene, maleated polyisoprene, or mixtures thereof.

* * * * *